US006915554B2

(12) United States Patent
Yang

(10) Patent No.: US 6,915,554 B2
(45) Date of Patent: Jul. 12, 2005

(54) PROCESS OF MOLDING AND ASSEMBLING THREE-DIMENSIONAL ORNAMENTS

(75) Inventor: Li Yun Yang, Tu Cheng (TW)

(73) Assignee: Big Bazar Corp., Taipei Hsien (TW)

( * ) Notice: Subject to any disclaimer, the term of this patent is extended or adjusted under 35 U.S.C. 154(b) by 0 days.

(21) Appl. No.: 10/407,418

(22) Filed: Apr. 7, 2003

(65) Prior Publication Data

US 2004/0123443 A1 Jul. 1, 2004

(30) Foreign Application Priority Data

Dec. 27, 2002 (TW) ........................................ 91137751 A

(51) Int. Cl.[7] .......................... B23P 25/00; B29C 39/12
(52) U.S. Cl. .......................... 29/527.1; 29/450; 29/453; 40/334; 40/905; 401/195; 401/243; 401/247; 264/245; 264/246; 264/247; 264/250; 264/255
(58) Field of Search .......................... 29/428, 450, 453, 29/527.1, 527.2; 401/195, 243, 247; 40/905, 334; 264/219, 245, 246, 247, 250, 255

(56) References Cited

U.S. PATENT DOCUMENTS

| | | | | |
|---|---|---|---|---|
| 836,905 A | * | 11/1906 | Whitehouse | 401/243 |
| 1,837,471 A | * | 12/1931 | Neidich | 138/141 |
| 2,147,770 A | * | 2/1939 | Ford | 264/643 |
| 2,298,365 A | * | 10/1942 | Gits et al. | 264/247 |
| 2,537,116 A | * | 1/1951 | Aimes | 40/334 |
| 2,651,079 A | * | 9/1953 | Michaelson et al. | 264/162 |
| 2,896,348 A | * | 7/1959 | Herne | 40/334 |
| 2,971,283 A | * | 2/1961 | Parker | 40/334 |
| 3,534,440 A | * | 10/1970 | Roberts | 425/195 |
| 4,381,615 A | * | 5/1983 | Lonsmin | 40/334 |
| 4,880,588 A | * | 11/1989 | Brault et al. | 264/163 |
| 5,336,458 A | * | 8/1994 | Hutchison et al. | 264/220 |
| 6,019,536 A | * | 2/2000 | Lee | 401/195 |
| 6,129,470 A | * | 10/2000 | Fang | 401/52 |
| 6,171,005 B1 | * | 1/2001 | Kuo | 401/195 |
| 6,174,098 B1 | * | 1/2001 | Yeh | 401/52 |
| 6,238,609 B1 | * | 5/2001 | Stecker | 264/246 |
| 6,264,869 B1 | * | 7/2001 | Notarpietro et al. | 264/247 |
| 6,299,372 B1 | * | 10/2001 | Wang | 401/195 |
| 6,375,376 B1 | * | 4/2002 | Hsu | 401/247 |
| 6,479,005 B1 | * | 11/2002 | Hsien | 264/219 |
| 6,688,794 B1 | * | 2/2004 | Hsu | 401/195 |
| 2004/0022574 A1 | * | 2/2004 | Huttner et al. | 401/88 |
| 2004/0062036 A1 | * | 4/2004 | Kuo | 362/118 |

* cited by examiner

Primary Examiner—Essama Omgba
(74) Attorney, Agent, or Firm—Browdy and Neimark, P.L.L.C.

(57) ABSTRACT

In a process of molding and assembling a three-dimensional ornament, a mold having a recess in which is formed an opening is provided. A molding pattern is located inside the opening. A first material fills in the molding pattern to form a plurality of protruded decoration patterns. Then, a second material is charged in the opening and the recess of the mold over the first material to respectively form a projection and a contact wall which together form an embossment. The embossment then is removed from the mold. The embossment then is mounted inside a hollow pen tube in a manner that the projection fits in a sidewall opening of the pen tube and the protruded decoration patterns protrude from the sidewall opening. A sleeve is inserted in the hollow pen tube to urge the contact wall of the embossment against the wall of the hollow pen tube.

7 Claims, 7 Drawing Sheets

PROCESS OF MOLDING AND ASSEMBLING THREE-DIMENSIONAL ORNAMENTS

BACKGROUND OF THE INVENTION

1. Field of the Invention

The invention relates to a process of molding and assembling a three-dimensional ornament and, more particularly to a process of molding and assembling a three-dimensional ornament that is assembled with a hollow pen tube.

2. Description of the Related Art

A pen is a common writing tool in our daily life. In addition to its basic writing function, the aspect of the pen greatly influences its commercial values. The aspect design of the pen may be the object of writing tool exhibitions.

In the prior art, a pattern or character is marked on an exterior surface of the pen by, for example, printing. The pattern or the character printed on the pen has a two-dimensional shape, rather than three-dimensional shape. As the pen is used for a long period of time, the printed pattern or character is worn, deteriorating the aesthetic value of the pen.

SUMMARY OF INVENTION

It is therefore an object of the invention to provide a process of molding and assembling a three-dimensional ornament that overcomes the above disadvantages and allows finely shaped and aesthetic aspects of a pen.

It is another object of the invention to provide a process of molding and assembling a three-dimensional ornament that is firmly assembled with a hollow pen tube, and is not easily worn.

In order to achieve the above objectives of the invention, a process of molding and assembling a three-dimensional ornament is provided. The process of the invention includes:

1) providing a mold having a recess in which is formed an opening, wherein a molding pattern is located inside the opening;
2) filling a first material in the molding pattern to form a plurality of protruded decoration patterns;
3) charging a second material in the opening and the recess of the mold over the first material to respectively form a projection and a contact wall, wherein the first and second materials together form an embossment;
4) removing the embossment from the mold;
5) providing a hollow pen tube with a sidewall opening, wherein the embossment is mounted inside the hollow pen tube in a manner that the projection fits in the sidewall opening and the protruded decoration patterns protrude from the sidewall opening of the hollow pen tube; and
6) inserting a sleeve inside the roll of the hollow pen tube in a manner to urge the contact wall of the embossment against the wall of the hollow pen tube.

The multi-level design of the embossment made by the mold exhibits finely shaped and aesthetic aspects the conventional printing cannot provide. Protrusion of the decoration patterns from the sidewall opening of the hollow pen tube prevents the decoration patterns from being worn and therefore prolongs the service life of the embossment.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
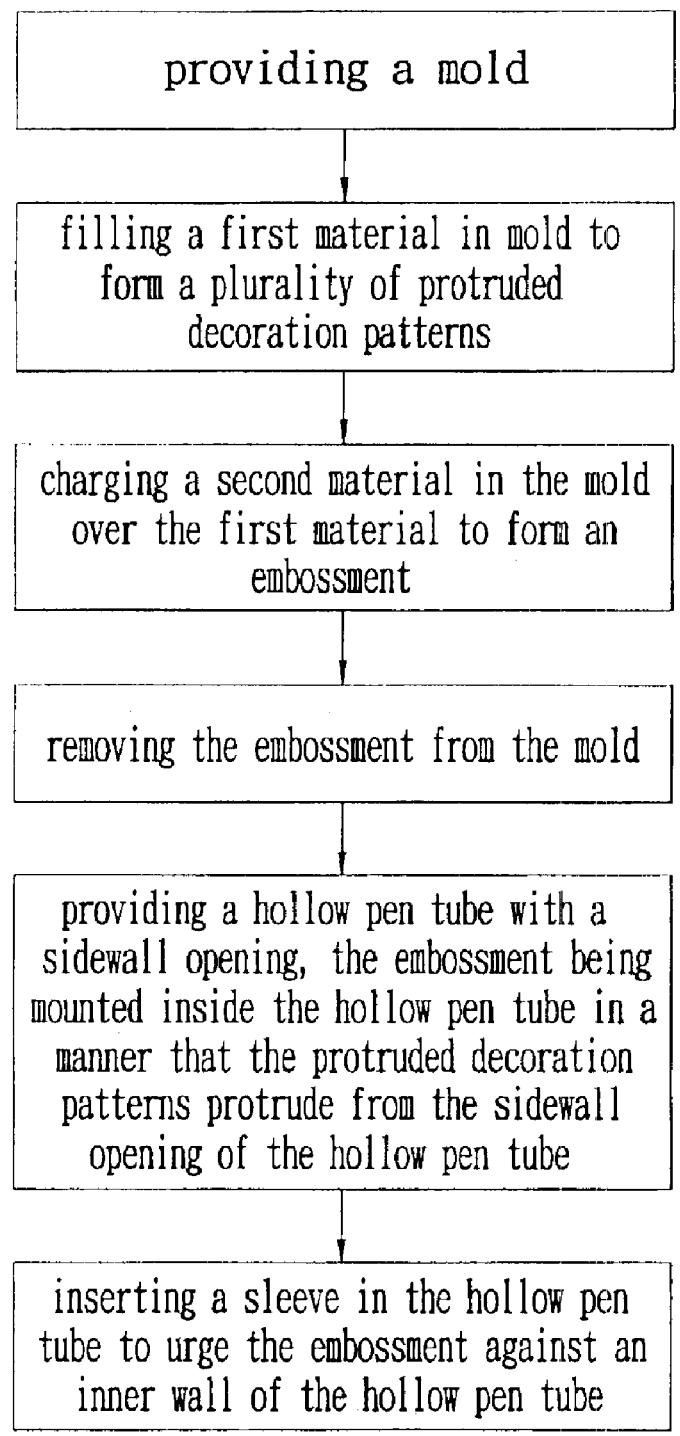
FIG. 1 is a flow chart of a process of molding and assembling a three-dimensional ornament according to one embodiment of the invention.

Wherever possible in the following description, like reference numerals will refer to like elements and parts unless otherwise illustrated.

Figure 2:
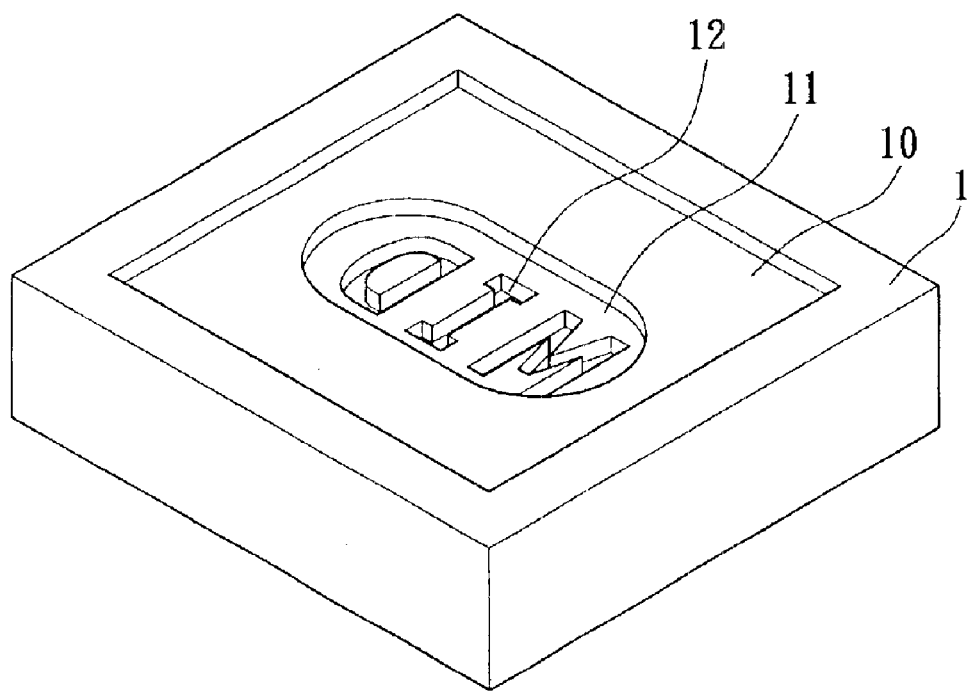
FIG. 2 is a perspective view of a mold used in a process of molding and assembling a three-dimensional ornament according to one embodiment of the invention.
Figure 3:
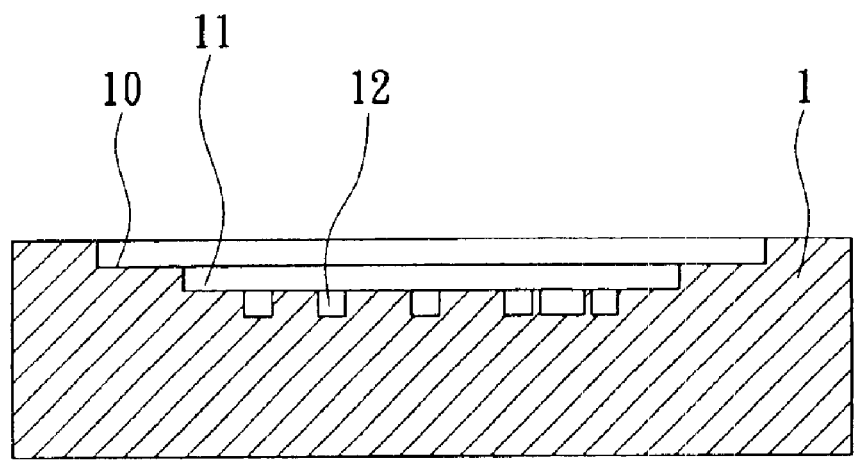
FIG. 3 is a cross-sectional view of a mold used in a process of molding and assembling a three-dimensional ornament according to one embodiment of the invention.
Figure 4:
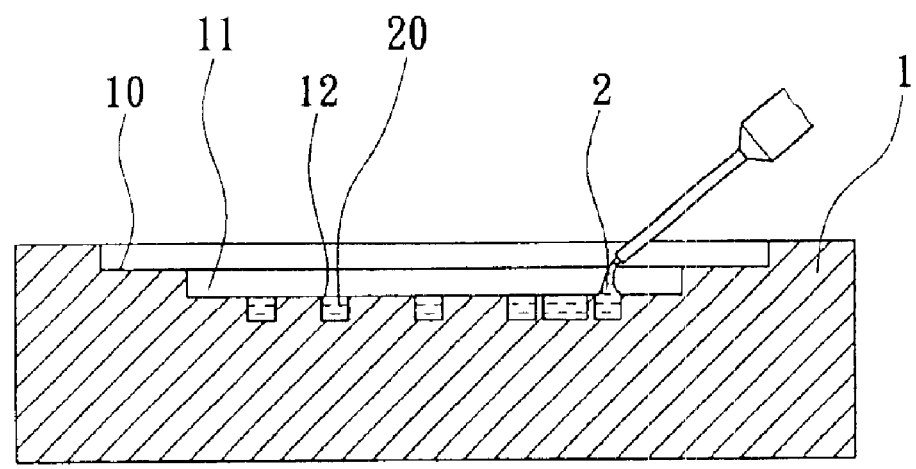
FIG. 4 is a cross-sectional view illustrating a mold filled with a first material in a process of molding and assembling a three-dimensional ornament according to one embodiment of the invention.
Figure 5:
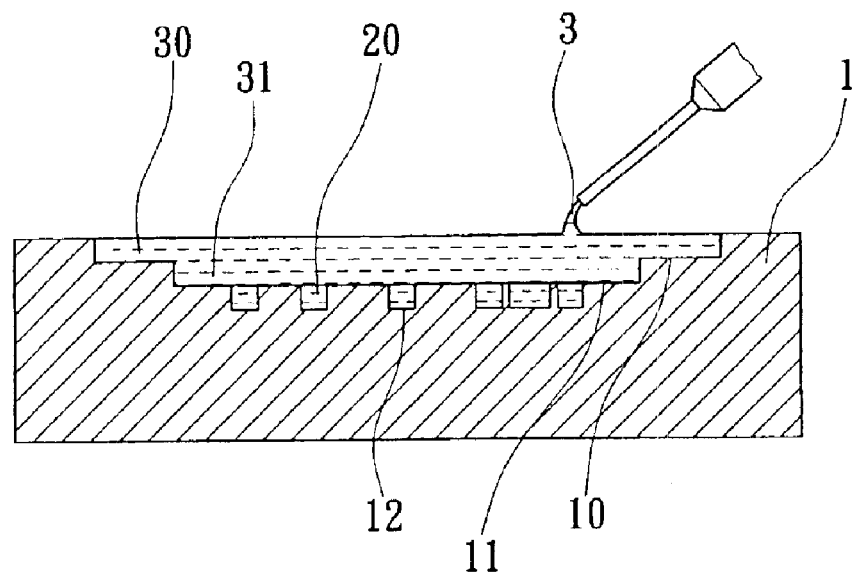
FIG. 5 is a cross-sectional view illustrating a mold charged with a second material in a process of molding and assembling a three-dimensional ornament according to one embodiment of the invention.
Figure 6:
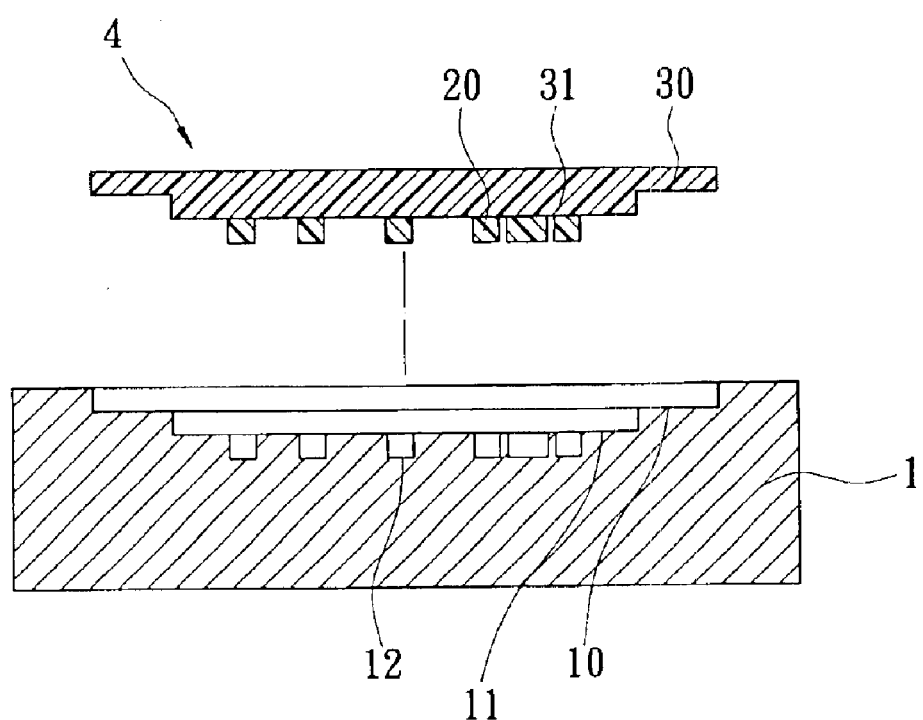
FIG. 6 is cross-sectional view illustrating a three-dimensional ornament, molded and removed from a mold, in a process of molding and assembling a three-dimensional ornament according to one embodiment of the invention.
Figure 7:
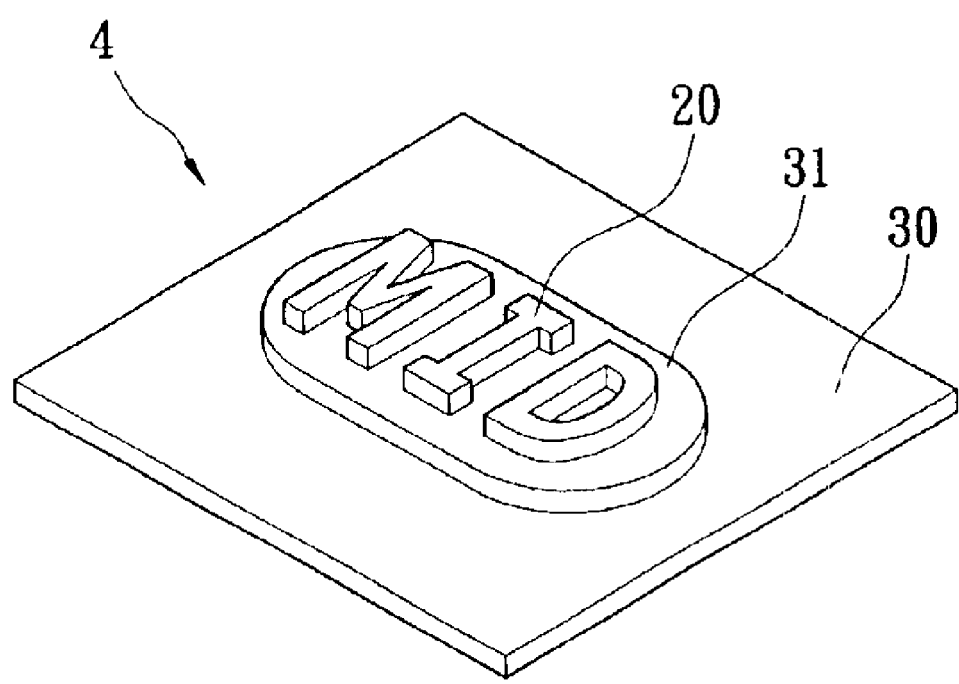
FIG. 7 is a perspective view of a three-dimensional ornament obtained by a process of molding and assembling a three-dimensional ornament according to one embodiment of the invention.
Figure 8:
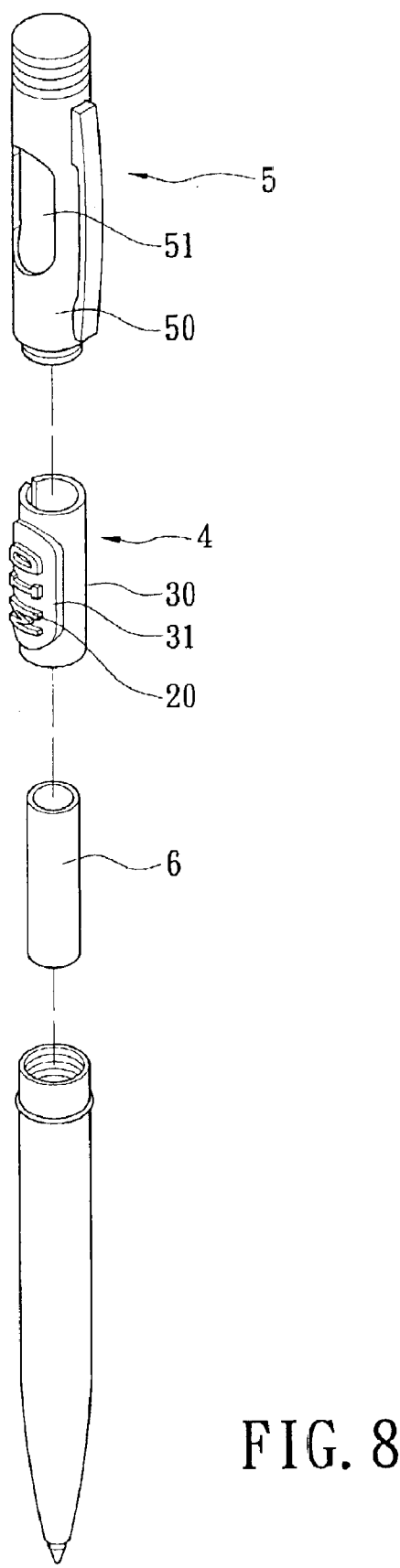
FIG. 8 is an exploded view of a three-dimensional ornament assembled with a hollow pen tube according to one embodiment of the invention.

Referring to FIG. 1, the invention provides a process of molding and assembling a three-dimensional ornament. The process of the invention includes the following steps:

1) As shown in FIG. 2 and FIG. 3, a provided mold 1 has a recess 10 inside which is further formed an opening 11. A pattern 12 is located inside the opening 11.
2) A first material 2 is filled in the pattern 12. The first material 2 is, for example, a rubber. As shown in FIG. 4, the first material 2 is hardened to form a plurality of protruded decoration patterns 20.
3) A second material 3 is formed in the opening 11 and the recess 10 over the first material 2, as shown in FIG. 5. The second material 3 is hardened to form a projection 31 and a contact wall 30 to which the protruded decoration patterns 20 are attached. The first and second materials 2, 3 together form an embossment 4, as shown in FIG. 7. The first and second materials 2, 3 are of different colors, for example, to obtain colorful projection 31 and protruded decoration patterns 20. The second material 3 is, for example, rubber.
4) The embossment 4 is removed from the mold 1, as shown in FIG. 6.
5) In FIG. 8, a hollow pen tube 5 is provided as an outer tube of a pen, for example. A sidewall opening 51 is formed through a wall 50 of the hollow pen tube 5. The embossment 4 is rolled and mounted inside the hollow pen tube 5 in manner that the contact wall 30 is embraced within the wall 50 of the hollow pen tube 5 and the projection 31 fits in the sidewall opening 51 of the hollow pen tube 5. Therefore, when the embossment 4 is mounted inside the hollow pen tube 5, the protruded decoration patterns 20 protrude from the sidewall opening 51 of the hollow pen tube 5.

6) A sleeve 6 is inserted inside the roll of the embossment 4, in a manner to urge the contact wall 30 of the embossment 4 against the wall 50 of the hollow pen tube 5.

Figure 9:
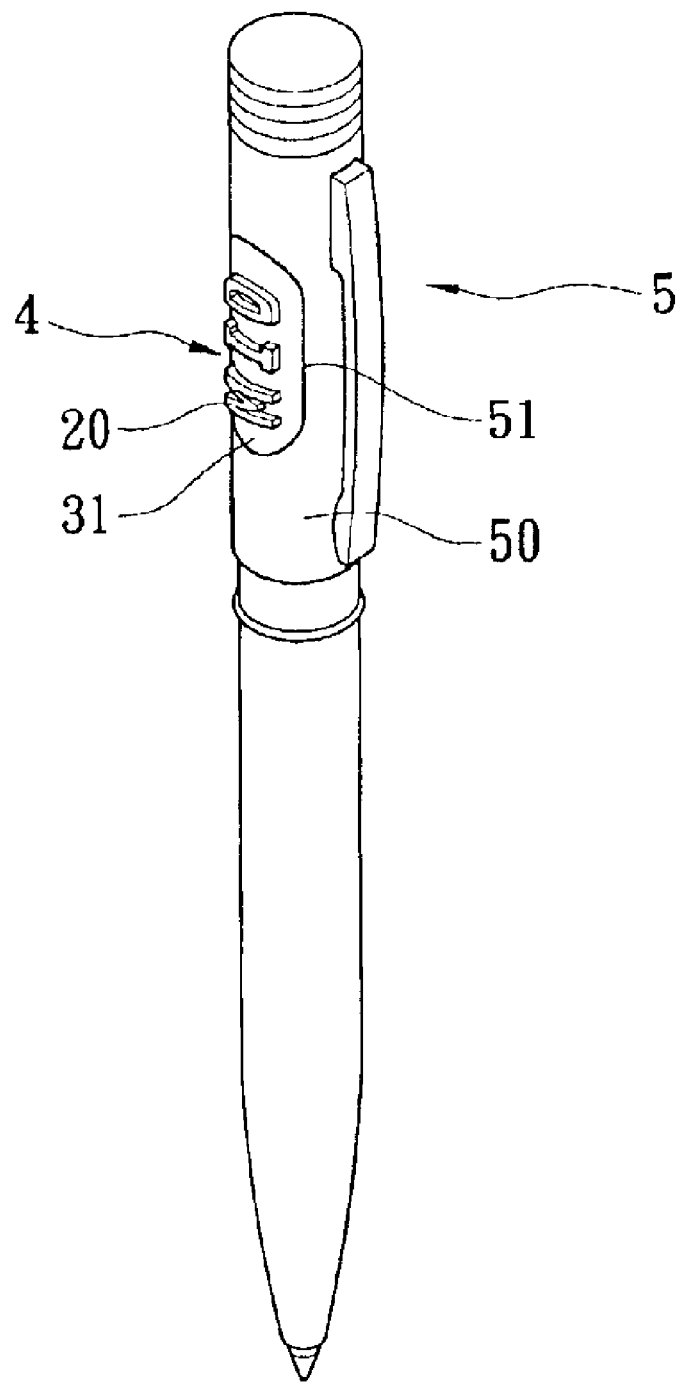
FIG. 9 is a perspective view of a three-dimensional ornament assembled with a hollow pen tube according to one embodiment of the invention.

FIG. 9 is a perspective view of a pen assembled with an embossment according to one embodiment of the invention. The recess 10, the opening 11 and the pattern 12 of the mold 1 are located at different levels to have the embossment 4 finely shaped, which exhibits a three-dimensionally aesthetic aspect a traditional printing cannot provide. Especially, when the color of the materials 2, 3 respectively used to make the protruded decoration patterns 20 and the projection 31 are different from each other, the protruded decoration patterns 20 and the projection 31 can be distinguished. Furthermore, the embossment 4 is inserted inside the hollow pen tube and the protruded decoration patterns 20 protrude from the opening 51 of the hollow pen tube 5, which prevents the protruded decoration patterns 20 from contact hand wearing. Therefore, the protruded decoration patterns 20 of the embossment 4 remains intact and clear even through a long period of use.

As described above, the process of molding and assembling a three-dimensional ornament according to the invention provides the following advantages.

1. The multi-level design of the embossment made by the mold exhibits fine shaped and aesthetic aspects the conventional printing process cannot provide.
2. The first and second material individually charged in the mold can be of different colors. The colorful materials thereby distinguish the embossment.
3. Protrusion of the decoration patterns from the opening of the hollow pen tube prevents the decoration patterns from being worn and therefore prolongs the service life of the embossment.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A method of molding and assembling a three-dimensional ornament, comprising the steps of:
   providing a mold that has a recess, an opening formed below the recess and a plurality of molding pattern slots formed below the opening;
   filling a first material in the molding pattern slots to form a plurality of protruded decoration patterns;
   charging a second material in the opening and the recess of the mold above the first material to respectively form a projection and a contact wall, and wherein the first and second materials together form an embossment;
   removing the embossment from the mold;
   providing a hollow pen tube with a sidewall opening having an area substantially equal to that of the projection, wherein the embossment is mounted on a wall of the hollow pen tube so that the projection fits in the sidewall opening of the hollow pen tube and the protruded decoration patterns protrude from the sidewall opening of the hollow pen tube; and
   inserting a sleeve inside the hollow pen tube to urge the contact wall of the embossment against the wall of the hollow pen tube and the projection into the sidewall opening.

2. The method of claim 1, wherein the second material is charged after the first material is hardened.

3. The method of claim 1, wherein a color of the first material is different from that of the second material.

4. The method of claim 1, wherein the embossment is rolled and mounted inside the hollow pen tube in manner so that the contact wall is engaged within the wall of the hollow pen tube.

5. The method of claim 1, wherein the hollow pen tube is an outer tube for a pen.

6. The method of claim 1, wherein the first material is a rubber.

7. The method of claim 1, wherein the second material is a rubber.

* * * * *